United States Patent [19]
Barnard

[11] Patent Number: 5,701,967
[45] Date of Patent: Dec. 30, 1997

[54] CABLE CONTROL LEVER APPARATUS

[75] Inventor: Michael A. Barnard, Wichita, Kans.

[73] Assignee: Wescon Products Company, Wichita, Kans.

[21] Appl. No.: 591,869

[22] Filed: Jan. 25, 1996

[51] Int. Cl.[6] .................................................. A01D 75/20
[52] U.S. Cl. .................... 180/19.3; 74/471 R; 56/10.8
[58] Field of Search ................... 180/19.3, 19.1, 180/19.2, 315; 74/523, 471 R, 480; 56/10.8, 11.3, 11.8

[56] References Cited

U.S. PATENT DOCUMENTS

| | | |
|---|---|---|
| 3,942,604 | 3/1976 | Black, III . |
| 4,132,280 | 1/1979 | Jones et al. . |
| 4,167,221 | 9/1979 | Edmonson et al. . |
| 4,230,200 | 10/1980 | Carolan . |
| 4,281,732 | 8/1981 | Hoch . |
| 4,363,206 | 12/1982 | Schmitt . |
| 4,413,466 | 11/1983 | Beugelsdyk et al. . |
| 4,432,191 | 2/1984 | Schmitt . |
| 4,466,232 | 8/1984 | Beugelsdyk et al. . |
| 4,466,308 | 8/1984 | Kester et al. . |
| 4,476,643 | 10/1984 | Hilchey et al. . |
| 4,538,401 | 9/1985 | Takamizawa et al. . |
| 4,747,256 | 5/1988 | Sadakane ............................ 56/11.3 |
| 4,805,386 | 2/1989 | Urban ................................. 56/10.8 |
| 4,850,182 | 7/1989 | Barnard et al. . |
| 4,869,124 | 9/1989 | Czeban et al. . |
| 4,930,369 | 6/1990 | Barnard et al. . |
| 4,932,192 | 6/1990 | Ishimaru . |
| 5,076,411 | 12/1991 | Kramer et al. . |
| 5,195,307 | 3/1993 | Thorud et al. . |
| 5,261,214 | 11/1993 | Wollersheim . |
| 5,279,101 | 1/1994 | Sueshige . |
| 5,355,662 | 10/1994 | Schmidt ......................... 180/19.3 X |
| 5,542,241 | 8/1996 | Lydy et al. ..................... 180/19.3 X |

*Primary Examiner*—Christopher P. Ellis
*Attorney, Agent, or Firm*—Hovey, Williams, Timmons & Collins

[57] ABSTRACT

A cable control lever apparatus is provided for use in a walk-behind lawnmower. The lawnmower includes a mower deck, a handle bar connected to the deck for permitting walk-behind operation of the mower, and a pair of control cables supported for translational movement relative to the handle bar. The handle bar including a pair of laterally spaced side arms, and an end bar extending between the side arms and connecting them together. Each side arm includes a transverse hole aligned with the hole in the other arm for receiving a bail formed of a shape corresponding to the shape of the handle bar. The bail includes opposed out-turned ends sized for receipt in the holes in the handle bar to permit relative pivotal movement of the bail between a non-actuated position spaced from the end bar of the handle bar and an actuated position against the end bar. The bail is connected to one of the cables so that movement of the bail is transmitted to the cable. A lever is supported for pivotal movement on one of the out-turned ends of the bail between the bail and the handle bar so that when the bail is in the actuated position, the lever can be pivoted about the one out-turned end of the bail between a non-actuated position and an actuated position. The lever includes structure for retaining the lever in the actuated position, and for releasing the lever when the bail moves to the non-actuated position, allowing the lever to move to the non-actuated position.

7 Claims, 6 Drawing Sheets

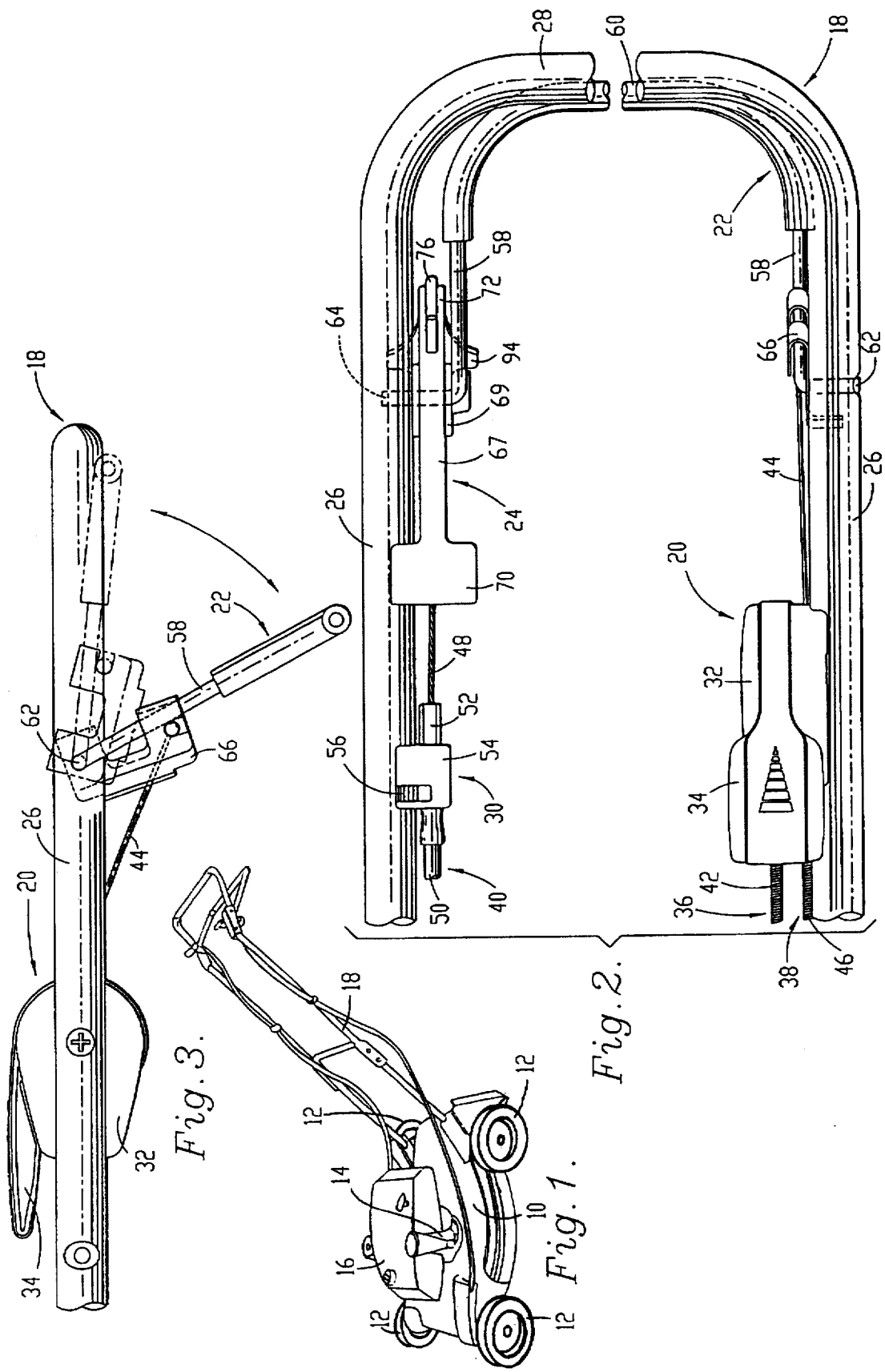

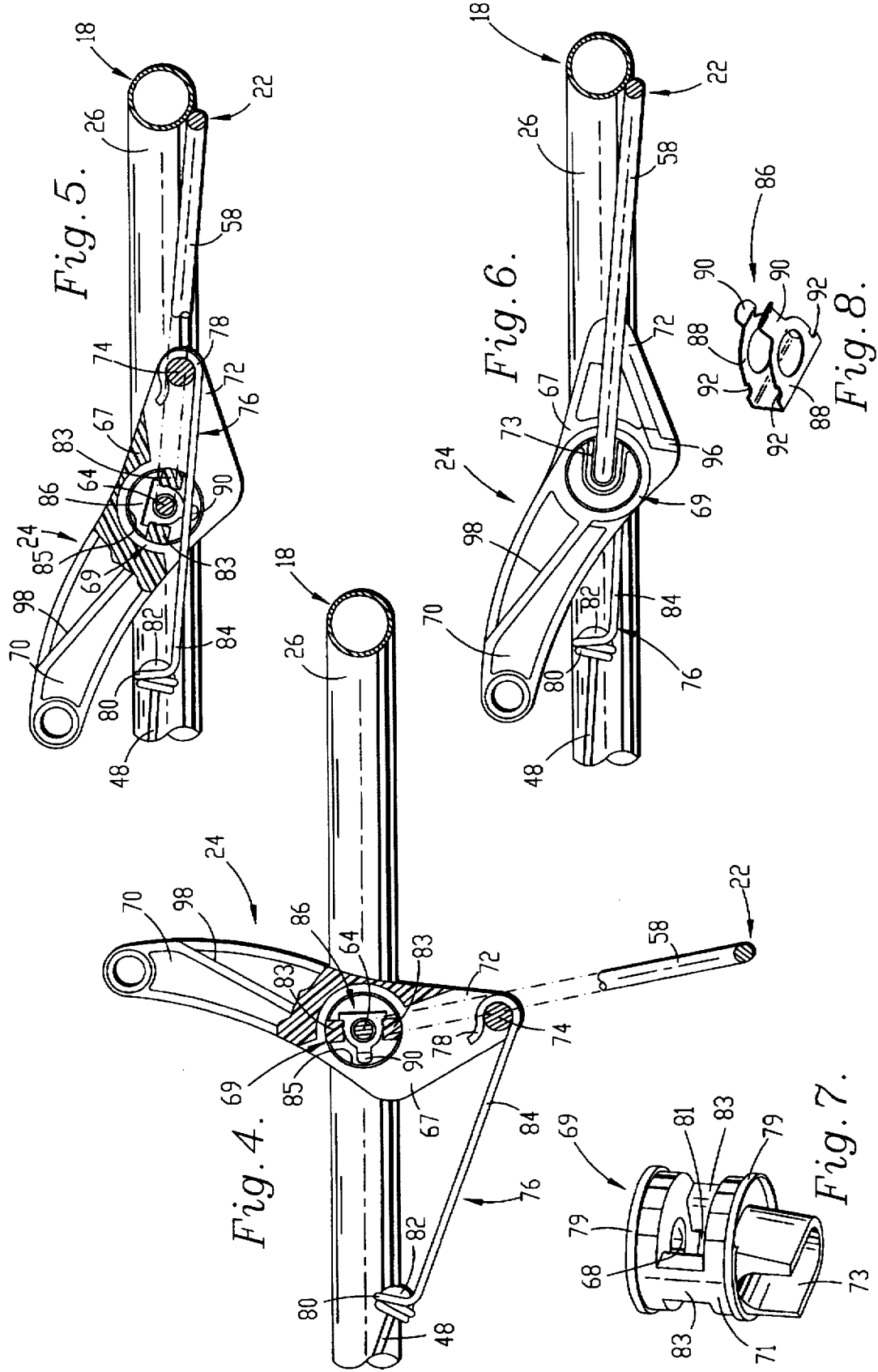

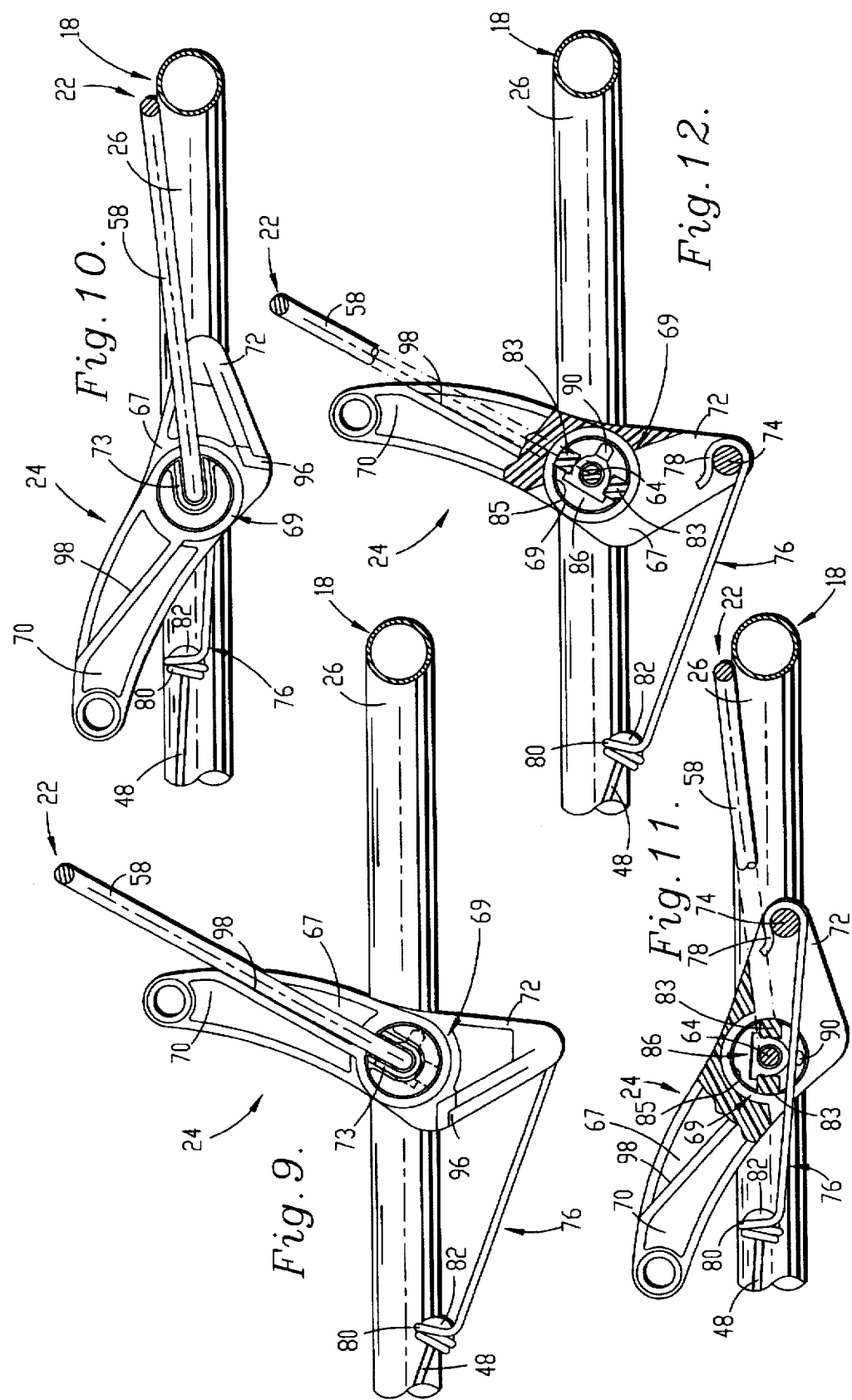

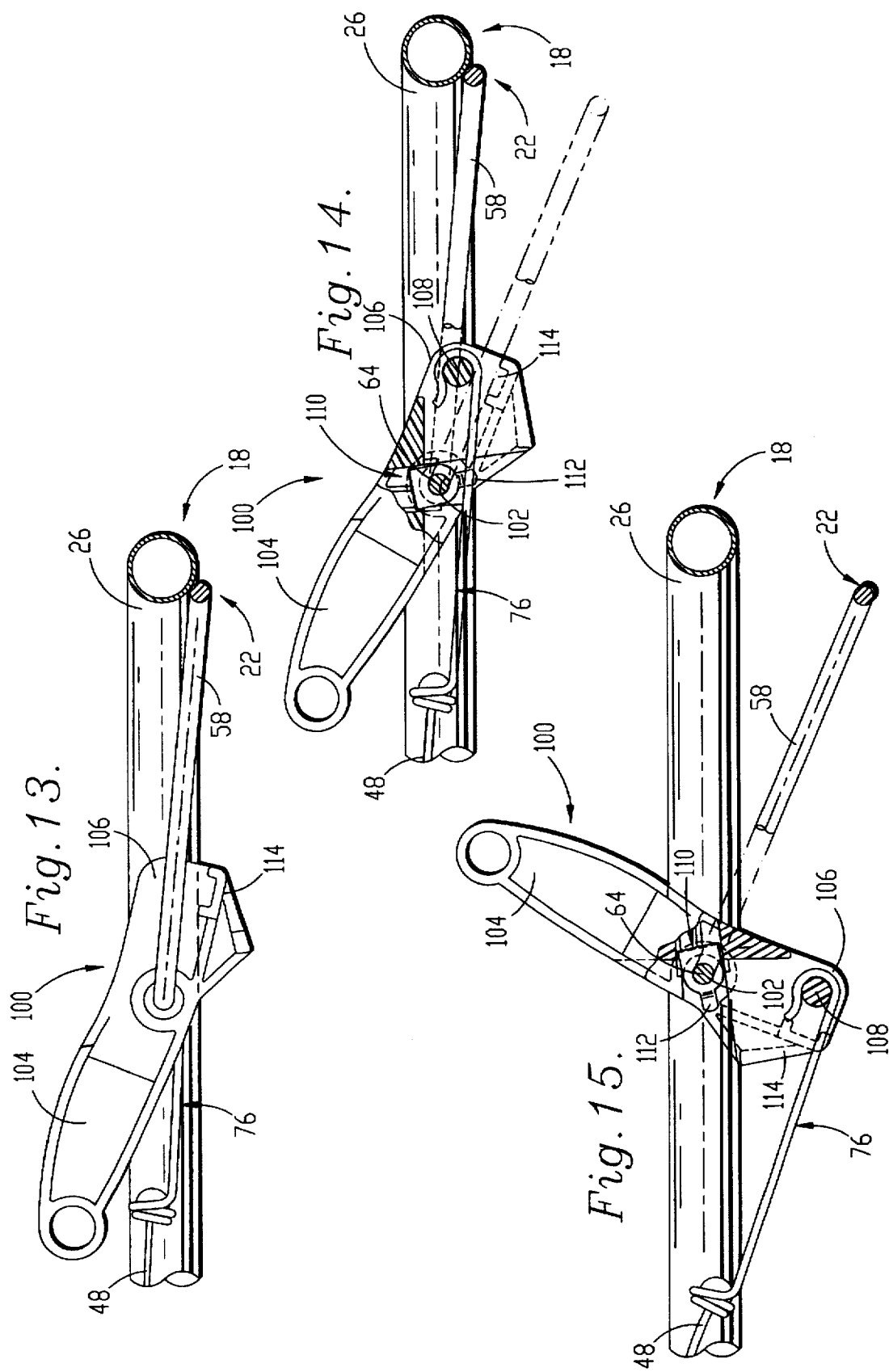

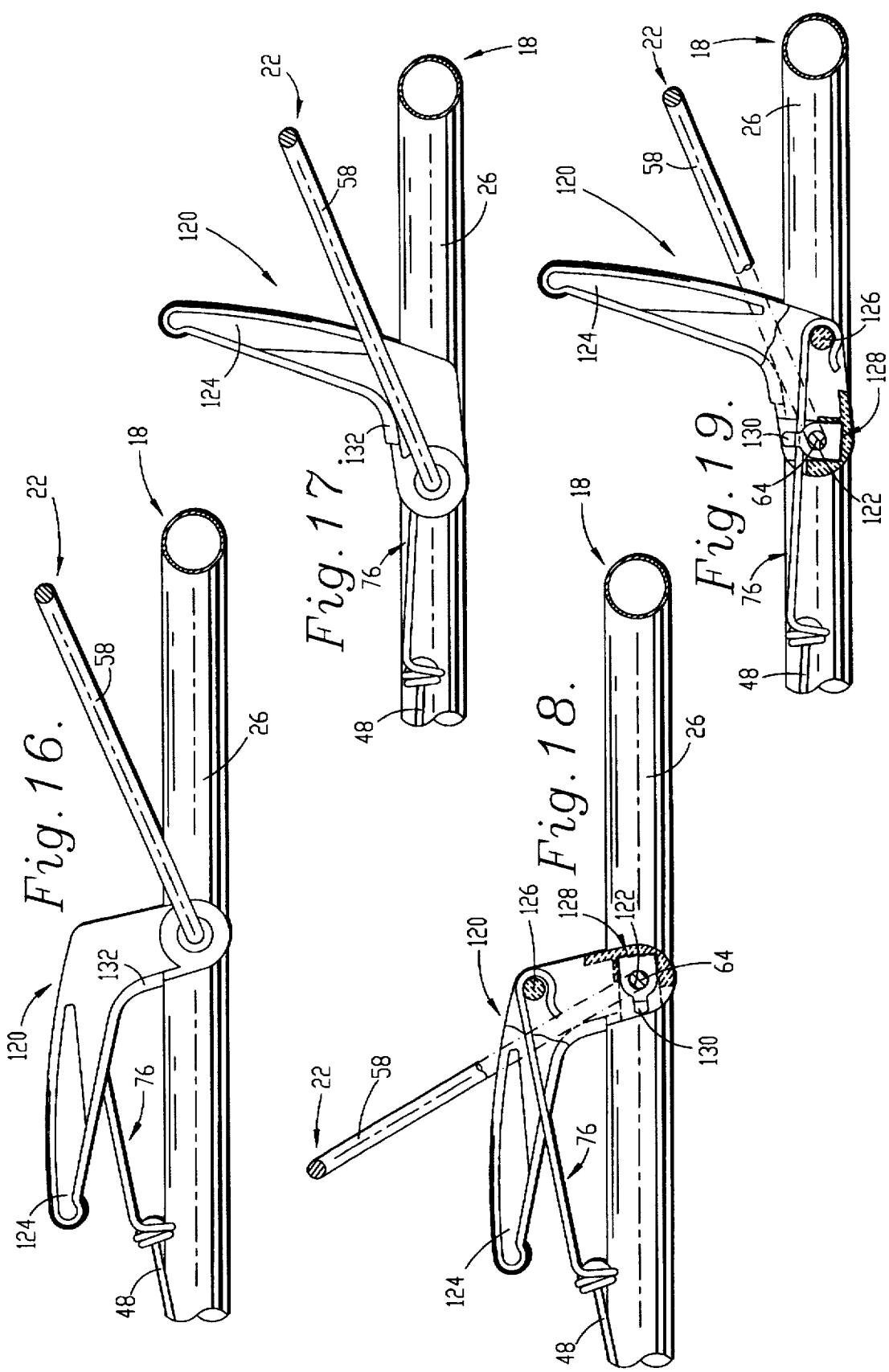

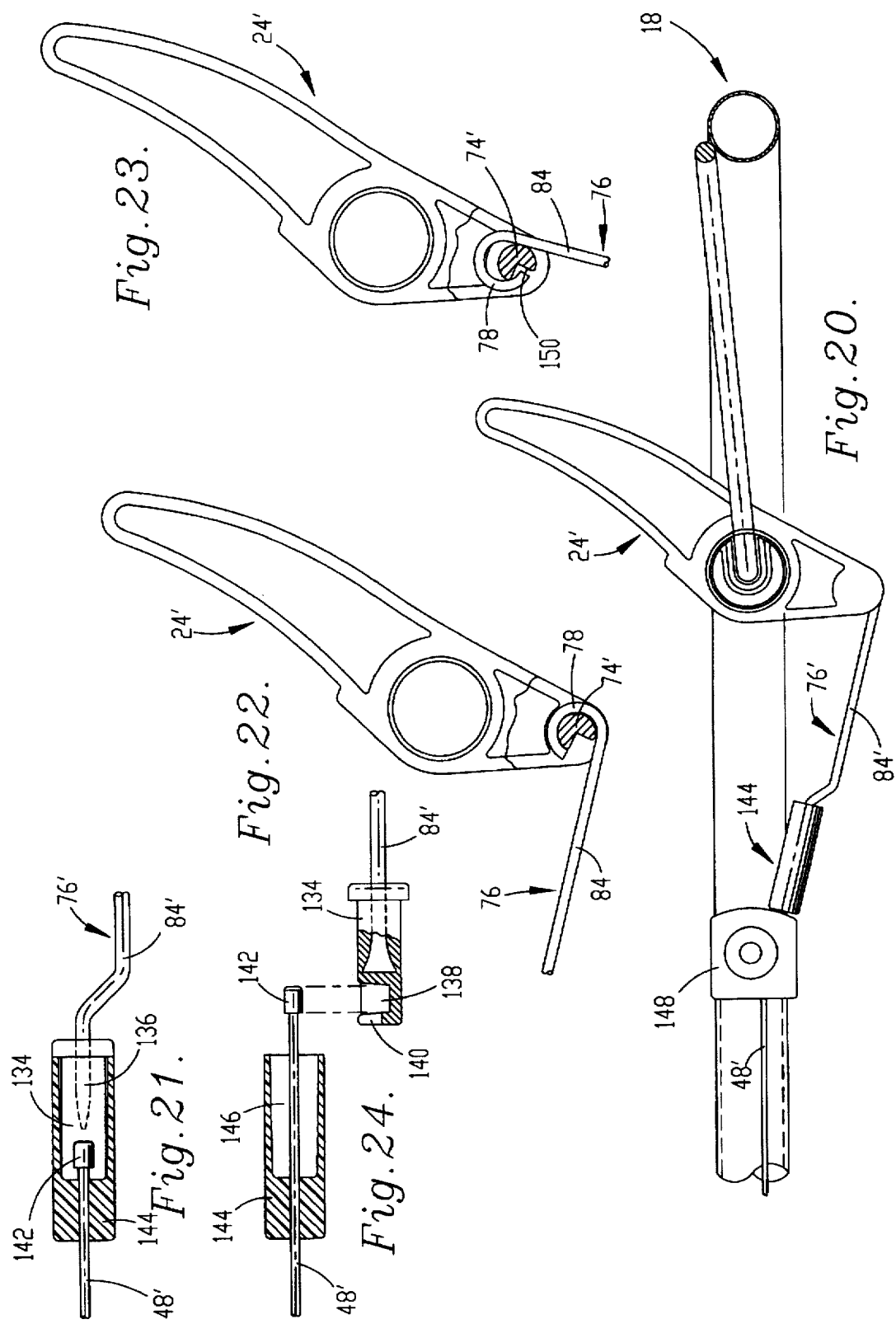

CABLE CONTROL LEVER APPARATUS

BACKGROUND OF THE INVENTION

1. Field of the Invention

The present invention relates generally to cable control devices and, more particularly, to a cable control lever apparatus for use in supporting and operating a pair of control cables of a walk-behind lawnmower.

2. Discussion of the Prior Art

It is known to provide a cable assembly for use on a walk-behind lawnmower for transmitting movement between actuating levers mounted on the handlebar of the lawnmower and several different possible control mechanisms mounted on the mower deck remote from the handlebar. For example, in certain lawnmowers, a ground drive control mechanism is provided for controlling the transmission of power to the wheels of the mower, and a blade control mechanism may also be provided for controlling the transmission of power to the mower blade. A throttle is usually also provided on conventional lawnmowers for controlling the speed of the motor.

Where a blade control mechanism is not used, a different type of safety means is provided for rendering the blade inoperative when the mower is left unattended. Typically, such a means includes a cable controlled secondary operation that must be made to allow the operator of the mower to start the engine.

The cable assemblies used to operate these various types of mechanisms include cables that are supported for translational movement within outer conduits, wherein each cable is connected between an actuating lever supported on the handle bar of the mower and the associated control mechanism. The conduits of each cable are also supported between the levers and the control mechanisms, but are fixed in place on the mower to guide shifting movement of the cables and permit the lever movement to be transmitted to the control mechanisms. An example of a specific ground drive and blade clutch control is provided in U.S. Pat. No. 4,850,182, to Barnard el al. (the '182 patent), the disclosure of which is incorporated herein by this express reference.

The presence of these various different levers on the handle bar of a lawnmower requires the use of a plurality of independent fasteners for securing each lever in place and for securing the cable conduits in alignment with the respective levers. In addition, manufacture and assembly of a lawnmower including this conventional construction is complicated, requiring a substantial amount of labor and expense. Further, the use of so many parts presents a problem of aesthetics.

In the ground drive and blade clutch control illustrated in the '182 patent, actuation of the ground drive lever is tied to operation of the safety bail so that once the bail has been actuated and the lever moved to a position engaging the ground drive mechanism of the mower, it is not possible to disengage the ground drive mechanism without releasing the bail at least partially. Thus, it is not possible to move the ground drive lever from the actuated to the non-actuated position independently of the bail.

Although it is possible in the conventional construction to disengage the ground drive mechanism by partially releasing the bail, this movement is sometimes a difficult one to make while the operator is also trying to manually push or pull the mower around an obstacle. It would be desirable to provide an alternate construction in which the operator is able to engage and disengage the ground drive mechanism independently of the bail while the bail is held in the actuated position.

OBJECTS AND SUMMARY OF THE INVENTION

It is an object of the present invention to provide a cable control lever apparatus for use in a walk-behind lawnmower, wherein the apparatus permits independent operation of a ground drive control lever while the safety bail is held in the actuated position.

It is another object of the invention to provide a cable control lever apparatus having a simple, inexpensive construction in which the ground drive control lever is supported for pivotal movement directly on the bail, reducing the complexity of the apparatus and simplifying assembly.

In accordance with these and other objects evident from the following description of a preferred embodiment of the invention, a cable control lever apparatus is provided for use in a lawnmower. The lawnmower has a mower deck, a handle bar connected to the deck for permitting walk-behind operation of the mower, and a pair of control cables supported for translational movement relative to the handle bar. The handle bar includes a pair of laterally spaced side arms, and an end bar extending between the side arms and connecting them together. Each side arm includes a transverse hole aligned with the hole in the other arm. The apparatus includes a bail formed of a shape corresponding to the shape of the handle bar and including opposed out-turned ends sized for receipt in the holes in the handle bar to permit relative pivotal movement of the bail between a non-actuated position spaced from the end bar of the handle bar and an actuated position against the end bar. A first connection means is provided for connecting a first one of the cables to the bail so that movement of the bail is transmitted to the first cable.

The apparatus also includes a lever supported for pivotal movement on one of the out-turned ends of the bail between the bail and the handle bar so that when the bail is in the actuated position, the lever can be pivoted about the one out-turned end of the bail between a non-actuated position and an actuated position. The lever includes a retaining means for retaining the lever in the actuated position, and a release means for releasing the lever from the retaining means when the bail moves to the non-actuated position, allowing the lever to move to the non-actuated position. A second connection means is provided for connecting a second one of the cables to the lever so that movement of the lever is transmitted to the second cable.

By providing a construction in accordance with the present invention, numerous advantages are realized. For example, by supporting the ground drive lever on an out-turned end of the bail, the lever is sandwiched between the bail and the handle bar of the mower while being supported for pivotal movement. Thus, it is not necessary to provide additional fasteners or supporting structure for the ground drive lever. In addition, because the bail is supported on the handle bar by the out-turned ends of the bail, a further savings of parts is obtained and the construction is simplified.

Another advantage obtained by employing the present invention results from the use of a release means, wherein the lever is released from the actuated position when the bail moves to the non-actuated position, allowing the lever to move to the non-actuated position. By providing this construction, the ground drive control lever is automatically kicked from the actuated position when the bail is released, insuring safe operation of the mower.

BRIEF DESCRIPTION OF THE DRAWING FIGURES

The preferred embodiment of the invention is described in detail below with reference to the attached drawing figures, wherein:

FIG. 1 is a perspective view of a walk-behind lawn mower;

FIG. 2 is a fragmentary top plan view of the lawn mower, illustrating a handle bar and cable control lever apparatus constructed in accordance with the preferred embodiment of the present invention;

FIG. 3 is a fragmentary side elevational view of the handle bar and cable control lever apparatus;

FIG. 4 is a fragmentary side sectional view of the cable control lever apparatus, illustrating a ground drive control lever in a non-actuated position and a bail that is disposed beneath the handlebar of the apparatus;

FIG. 5 is a fragmentary side sectional view of the cable control lever apparatus, illustrating the ground drive control lever in an actuated position;

FIG. 6 is a fragmentary side elevational view of the cable control lever apparatus, illustrating the ground drive control lever in an actuated position;

FIG. 7 is a perspective view of a hub forming a part of the ground drive control lever;

FIG. 8 is a perspective view of a retaining clip forming a part of the ground drive control lever;

FIG. 9 is a fragmentary side elevational view of the cable control lever apparatus, illustrating the ground drive control lever in a non-actuated position and a bail that is disposed above the handlebar of the apparatus;

FIG. 10 is a fragmentary side elevational view of the cable control lever apparatus of FIG. 9, illustrating the ground drive control lever in an actuated position;

FIG. 11 is a fragmentary side sectional view of the cable control lever apparatus of FIG. 9, illustrating the ground drive control lever in an actuated position;

FIG. 12 is a fragmentary side sectional view of the cable control lever apparatus of FIG. 9, illustrating the ground drive control lever in a non-actuated position;

FIG. 13 is a fragmentary side elevational view of the cable control lever apparatus, illustrating a second embodiment of the ground drive control lever in an actuated position;

FIG. 14 is a fragmentary side sectional view of the cable control lever apparatus, illustrating the second embodiment of the ground drive control lever in the actuated position;

FIG. 15 is a fragmentary side sectional view of the cable control lever apparatus, illustrating the second embodiment of the ground drive control lever in a non-actuated position;

FIG. 16 is a fragmentary side elevational view of the cable control lever apparatus, illustrating a third embodiment of the ground drive control lever in a non-actuated position;

FIG. 17 is a fragmentary side elevational view of the cable control lever apparatus, illustrating the third embodiment of the ground drive control lever in an actuated position;

FIG. 18 is a fragmentary side sectional view of the cable control lever apparatus, illustrating the third embodiment of the ground drive control lever in the non-actuated position;

FIG. 19 is a fragmentary side sectional view of the cable control lever apparatus, illustrating the third embodiment of the ground drive control lever in the actuated position;

FIG. 20 is a fragmentary side elevational view of the cable control lever apparatus constructed in accordance with the preferred embodiment, illustrating various modifications of the apparatus;

FIG. 21 is a sectional view of a bumper element forming a part of the apparatus;

FIG. 22 is a side elevational view of the ground drive control lever, illustrating a modified pin for supporting a coupling element of the apparatus;

FIG. 23 is a side elevational view of the lever, illustrating the lever and coupling element during assembly; and FIG. 24 is an exploded sectional view of the bumper element shown in FIG. 21.

DETAILED DESCRIPTION OF A PREFERRED EMBODIMENT

A cable control lever apparatus for use in transmitting movement between a ground drive control lever and the ground drive control mechanism of a lawnmower is illustrated in FIG. 1. In the preferred embodiment, the apparatus is employed in a conventional walk-behind lawnmower, including a mower deck 10 supported on wheels 12, a blade suspended from the deck, an engine or motor 14 supported on the deck and connected to the blade, a shroud or cover 16 extending over the engine or motor elements, and a handlebar 18 extending upward from the deck. As shown in FIG. 2, the handle bar supports a throttle lever assembly 20, a hand-actuated safety bail 22, and the ground drive control lever 24.

The handlebar 18 of the mower includes a pair of laterally spaced side arms 26 and an end bar 28 extending between the side arms and connecting them together. The handle bar 18 is preferably formed of a single piece of tubular metal that is shaped to form the side arms and end bar. Each side arm 26 includes a transverse hole extending through the arm in alignment with the hole formed in the opposite side arm, and these holes support the safety bail. In addition, holes may also be provided in the side arms 26 for supporting the throttle lever assembly 20 and a cable adjustment assembly 30.

The throttle lever assembly 20 is supported on the handle bar below the safety bail, and includes a housing 32 that is secured to the handle bar by a suitable fastener, and a throttle lever 34 that is supported on the housing for pivotal movement about an axis extending transverse to the length of the side arms of the handle bar. The housing 32 is provided with a means for supporting a throttle control cable assembly 36 as well as a safety cable assembly 38 relative to the handle bar. A ground drive control cable assembly 40 extends along the opposing side arm of the handle bar and is supported by the cable adjustment assembly 30.

The throttle cable assembly 36 includes a cable supported for translational movement within an outer conduit 42. The conduit includes a fitting at the upper end for supporting the conduit in a fixed position relative to the housing 32 while the cable extends through the fitting and is connected to the lever. The safety cable assembly 38 includes a cable 44 supported for translational movement within an outer conduit 46. The conduit is supported in a fixed position relative to the housing 32 while the cable extends through the conduit and is connected to the bail 22. The ground drive control cable assembly 40 includes a cable 48 supported for translational movement within an outer conduit 50.

The cable of each of the cable assemblies 36, 38, 40 is preferably constructed of a single strand of thick metal wire well-suited for transmitting axial shifting movement within the conduit. However, any other cable material may be used so long as the material is capable of bearing the loads necessary to permit the cable to transmit forces between the levers or bail and the mower. The conduit of each cable assembly preferably is a Bowden wire conduit including a wire that is coiled like a spring. Alternately, each conduit may be formed of multiple wires that are wound in a helix. These constructions provide a flexible conduit that receives the cable for relative axial shifting movement while restricting buckling of the cable. If desired, a thermoplastic resin material can be extruded or otherwise applied over the conduit for weather-proofing purposes.

With regard to the ground drive control cable assembly 40, the conduit 50 includes an upper fitting 52 for supporting the conduit on the cable adjustment assembly 30. The fitting 52 is supported by the cable adjustment assembly which permits adjustment of the axial position of the conduit 50 relative to the handle bar 18 in order to permit the take-up of slack in the cable assembly. The adjustment assembly 30 includes a housing 54 presenting a bore sized for receipt of the fitting, and a button 56 supported on the housing for movement between a disengaged position in which the fitting is movable relative to the housing and an engaged, locked position in which the fitting is secured relative to the housing. The button 56 is biased by a spring toward the engaged position so that the conduit is normally locked against axial movement. However, when the button is depressed against the biasing force of the spring, adjustment of the axial position of the conduit is possible.

The safety bail 22 is constructed of a single piece of cylindrical metal stock material formed into a shape corresponding to the shape of the handle bar 18. Thus, the bail includes a pair of parallel side arms 58 and an end bar 60 extending between the side arms and connecting them together. The side arms 58 are spaced from one another by a distance less than the space separating the side arms 26 of the handle bar 18, and include out-turned ends 62, 64 sized for receipt in the holes in the handle bar so that the bail can be supported on the handle bar for relative pivotal movement between a non-actuated position spaced from the end bar of the handle bar, as shown in FIG. 3, and an actuated position against the end bar, as shown in FIGS. 4–6.

As discussed below, a unique feature of the preferred embodiment of the inventive ground drive control lever is that the same lever can be used either with a lower bail, as shown in FIGS. 4–6, wherein the bail is suspended beneath the handle bar in the non-actuated position and is drawn up against the handle bar when actuated, or with an upper bail, as shown in FIGS. 9–12, wherein the bail is disposed above the handle bar in the non-actuated position and is pulled down against the handle bar when actuated. The ground drive control lever illustrated in FIGS. 4–6 is the same lever shown in FIGS. 9–12. The only difference in these configurations is the positioning of the safety bail relative to the handle bar. Thus, it is possible to employ a single lever construction for use with either an upper or lower safety bail, as desired by the manufacturer of the apparatus.

Returning to a description of the apparatus as shown in FIG. 3, a bracket 66 is supported on one of the side arms 58 of the bail and includes a means for connecting the bail to the safety cable 44 so that movement of the bail is transmitted to the safety means for rendering the blade inoperative when the safety bail is released. In one form of the invention, the safety means includes a blade control mechanism for engaging the blade with the motor 14 when the bail is held against the handle bar. In another form of the invention, the safety means presents a secondary operation that is necessary to release the drum brake from around the flywheel of the mower to allow the operator to start the engine.

Regardless of the type of safety means employed, it is conventional to apply a tensile biasing force on the safety cable 44 so that the bail is constantly biased toward the non-actuated position. This construction guarantees that if, for any reason, the bail is released, it moves to the non-actuated position and the safety means disengages the blade.

With reference to FIG. 6, the ground drive control lever 24 is just one of three control lever embodiments illustrated in the drawing, and broadly includes a lever body 67, a hub 69 on which the lever body is supported for rotational movement, and a retaining clip 86 supported on the hub. The hub 69 is illustrated in FIG. 7, and is formed of a single unitary piece of molded thermoplastic resin, presenting a generally cylindrical shape. The hub includes opposed axial end surfaces and a circumferential side surface 71 extending between the end surfaces. The hub defines a central longitudinal axis along which is provided an axially extending bore 68 by which the hub is supported on the out-turned end 64 of the safety bail for relative rotational movement. One of the end surfaces includes a generally U-shaped wall 73 that protrudes from the surface to define a recess extending radially from the central bore and within which the elbow between the side arm 58 and the out-turned end 64 of the bail is received when the lever is assembled on the apparatus. As shown in FIG. 6, the U-shaped wall 73 secures the hub 69 on the bail 22 so that the hub and bail always move together relative to the lever.

Returning to FIG. 7, the circumferential side surface 71 of the hub 69 is of a diameter sized for receipt within the lever body 67, and supports the lever body for rotational movement about the central longitudinal axis of the hub. A circumferentially extending flange 79 is provided at each axial end of the hub adjoining the side surface for supporting the lever body on the hub and guiding rotation of the body about the axis. A radially extending opening 81 is formed in and extends completely through the hub at a position intermediate the end surfaces, and defines a pair of diametrically opposed, axially extending shoulders 83 that serve as a means for mounting the spring clip on the lever, as described below.

The lever body 67 is shown in FIG. 4, and is formed of a single unitary piece of molded thermoplastic resin. The body includes a transverse hole 85 extending through the lever at a centralized position intermediate the opposed ends thereof. To one side of the hole, a lever handle 70 extends by which the lever may be gripped for movement. The opposite end 72 of the lever includes a transverse pin 74 by which the lever is connected to the cable. Preferably, a coupling element 76 is provided for connecting the lever to the cable. The coupling element is a rigid piece of metal and includes a hook end 78 that engages the pin of the lever and a coiled end 80 that receives an end connector 82 of the cable 48. An elongated intermediate section 84 is also provided by which the coupling element is gripped by the retaining clip 86.

The retaining clip is shown in FIG. 8, and functions as a retaining means for retaining the lever 24 in the actuated position while permitting the lever to be returned to the non-actuated position when a force is exerted on the lever sufficient to overcome the retention force of the clip on the coupling element. The retaining clip is formed of a unitary piece of spring metal and includes a pair of laterally spaced side faces 88 defining a pair of fingers 90 extending in a direction generally transverse to the axis of the hole through the lever. An upper end wall of the clip extends between and connects the side faces together. In addition, the side faces 88 are each formed with a transverse hole having a diameter sized for receipt of the out-turned end 64 of the bail 22, and a means is provided for mounting the spring clip on the hub with the holes in the spring clip aligned with the central bore in the hub. As shown in FIG. 4, this means includes the shoulders 83 of the hub 69, and sockets 92 are provided on the side faces of the spring clip, as shown in FIG. 8, that are sized for receipt of the shoulders. This construction supports the spring clip on the hub and aligns it with the central bore so that the clip and hub always rotate together, and the lever can be mounted on the hub for rotation relative to the hub, the clip, and the safety bail.

The fingers 90 defined by the side faces 88 of the clip 86 each include an in-turned shoulder and a distal, outwardly tapered tip so that the coupling element 76 is guided between the fingers as the lever is pivoted to the actuated position. As shown in FIG. 5, once the coupling element 76 passes over the shoulders of the fingers 90, these shoulders retain the coupling element on the hub relative to the lever. Thereafter, in order to move the lever from the actuated position, it is necessary to pull the handle 70 with a force sufficient to release the coupling element from between the fingers.

During use, the lever may be moved back and forth between the actuated position of FIG. 6 and the non-actuated position of FIG. 4 after the bail has been gripped and pulled up against the end bar 28 of the handle bar 18 to actuate the safety means. If the bail 22 is released at any time when the lever 24 is actuated, the bail is biased downward away from the handle bar to the non-actuated position, rotating the hub 69 and forcing the shoulders 83 of the hub against the coupling element 76. The shoulders of the hub operate as a release means for releasing the lever from the retaining clip, forcing the coupling element from between the fingers 90 of the retention clip 86 and allowing the lever 24 to move to the non-actuated position. The ground drive control cable 48 is normally retained in tension by a spring of the ground drive control mechanism and exerts a biasing force on the lever toward the non-actuated position. This biasing force facilitates movement of the lever from the actuated position when the bail is released from the handle bar.

The lever body includes a wing 96 protruding laterally from the body at a location spaced intermediate the hole 85 and the end 72 of the body. As shown in FIG. 1, the wing engages the handle bar when the lever is pivoted to the actuated position, limiting forward travel of the lever. In addition, a portion of the wing engages the handle bar when the lever is pivoted to the non-actuated position, limiting rearward travel of the lever. A shoulder 98 may also be provided on the lever body along the length of the handle for engaging the handle bar when the lever is pivoted to the actuated position.

As mentioned above, it is possible to employ the ground drive control lever 24 with an upper safety bail, as shown in FIGS. 9-12. When used in this environment, the lever 24 may be moved back and forth between the actuated position of FIG. 10 and the non-actuated position of FIG. 9 after the bail has been gripped and pulled down against the end bar of the handle bar to actuate the safety means. If the bail is released at any time when the lever is actuated, the bail lifts off of the handle bar to the non-actuated position, rotating the hub 69 from the position shown in FIG. 11 toward the position of FIG. 12, and forcing the shoulders 83 of the hub against the coupling element 76. The shoulders of the hub push the coupling element from between the fingers 90 of the retaining clip 86, overcoming the retention force and allowing the lever 24 to move to the non-actuated position under the biasing force of the tension spring of the ground drive control mechanism.

During operation of the lawnmower, at least two steps are required to initiate mowing. First, the bail 22 must be gripped and pulled against the end bar of the handle bar 18 to actuate the safety means. Second, the operator must manually start the engine of the mower. Once these two steps have been completed, the only additional step required to engage the ground drive mechanism of the mower is to move the ground drive lever 24 to the actuated position. This movement is transmitted to the ground drive mechanism by the cable 48.

If the operator encounters an obstacle or desires for any other reason to disengage the ground drive mechanism so that the mower can be physically pushed or pulled during continued mowing, the ground drive mechanism can be disengaged simply by moving the lever 24 to the non-actuated position. As long as the bail 22 remains held against the end bar of the handle bar 18, the lawnmower engine will remain running and the blade spinning. Thus, operation of the mower is not interrupted when the ground drive control lever is moved back and forth between the actuated and non-actuated positions. On the other hand, if the bail 22 is released, regardless of whether it is an upper or lower bail, it rotates the hub 69 so that the shoulders 83 of the hub engage the coupling element 76, forcing the coupling element from the retaining clip and releasing the lever for movement from the actuated position so that the ground drive mechanism is disengaged at the same time as the mower blade and/or engine.

The lever 24 cannot be actuated to engage the ground drive mechanism without also actuating the bail since the shoulders 83 of the hub 69 prevent the coupling element from engaging the retaining clip in the non-actuated position of the bail. Even if the lever was moved against the biasing force exerted on the bail 22 to the actuated position, release of the lever would result in a return thereof to the non-actuated position due to the orientation of the hub relative to the coupling element which prevents engagement of the coupling element by the spring clip.

A second embodiment of the ground drive control lever is shown in FIGS. 13-15, and is adapted solely for use with an apparatus having a lower bail that is positioned beneath the handle bar of the apparatus for movement between a non-actuated position in which the bail is dangling beneath the handle bar and an actuated position in which the bail is pulled up against the handle bar.

As shown in FIG. 13, the ground drive control lever 100 is formed of a single unitary piece of molded thermoplastic resin. Turning to FIG. 15, the lever includes a transverse hole 102 extending through the lever at a centralized position intermediate the opposed ends thereof. To one side of the hole, a lever handle 104 extends by which the lever may be gripped for movement. The end 106 of the lever opposite the handle includes a transverse pin 108 by which the lever is connected to the coupling element 76.

A retaining clip 110 retains the lever 24 in the actuated position upon movement of the lever to the actuated position, as shown in FIG. 14, but permits the lever to be returned to the non-actuated position of FIG. 15 when a force is exerted on the lever sufficient to overcome the gripping force of the retaining clip on the coupling element. The retaining clip is formed of a unitary piece of spring metal and is preferably similar to the clip illustrated in FIG. 8, including opposed side faces provided with transverse holes, and presenting fingers 112 that are biased toward one another and capture the coupling element when the element is moved between the fingers. A means is provided for mounting the retaining clip 110 on the lever 100 with the holes in the spring clip aligned with the transverse hole 102 in the lever. Preferably, this means includes a socket within which the spring clip is secured so that the spring clip and the lever always rotate together relative to the bail.

During use, as the lever 100 is moved to the actuated position shown in FIG. 14, the coupling element 76 passes over the shoulders of the fingers 112 and is retained in place relative to the lever 100. In order to move the lever from the actuated position, it is necessary to pull the handle 104 with a force sufficient to separate the fingers from one another and allow passage of the coupling element 76. Because the retaining clip 110 rotates with the lever, it rotates away from the coupling element as the lever is moved to the non-actuated position, facilitating release of the coupling element.

As shown in FIG. 13, the lever includes a pair of laterally extending wings 114 that protrude from the sides of the lever at a position radially spaced from the transverse hole 102. One of the wings defines a release means and is disposed within the path of movement of the bail 22 when the lever 100 is in the actuated position. Thus, when the bail moves from the actuated to the non-actuated position it contacts the wing of the lever and forces the lever against the retention force of the retaining clip 110, overcoming the retention force and releasing the lever 100 for movement to the non-actuated position under the biasing force of the spring of the ground drive control mechanism. The other wing engages the handle bar when the lever is pivoted to either of the actuated or non-actuated positions, limiting forward and rearward travel of the lever.

It is possible to eliminate the use of the retaining clip 110 from the lever 100 by employing a different type of means for biasing the lever in the actuated position. For example, in one alternate construction, the transverse pin of the lever can be positioned to provide an over-center biasing of the lever in both the actuated and non-actuated positions. A plane is defined which includes the axis of pivotal movement of the lever and is generally parallel to the longitudinal axis of the cable leading from the adjustment assembly. The transverse pin is disposed on the same side of the plane as the coupling element when the lever is in the non-actuated position and is disposed across the plane from the coupling element when the lever is moved to the actuated position. By providing this construction, the tension on the cable holds the lever in both the non-actuated and actuated positions due to the over-center positioning of the pin relative to the pivot axis of the lever.

During operation of the lawnmower, if the operator encounters an obstacle or desires for any other reason to disengage the ground drive mechanism so that the mower can be physically pushed or pulled during continued mowing, the ground drive mechanism can be disengaged simply by moving the lever 100 to the non-actuated position. As long as the bail 22 remains held up against the end bar of the handle bar 18, the lawnmower engine will remain running and the blade spinning. On the other hand, if the bail 22 is released while the ground drive lever is actuated, the bail contacts the wing 114 on the lever 100, forcing the lever from the actuated position so that the ground drive mechanism is disengaged at the same time as the mower blade and/or engine. The lever 100 cannot be actuated to engage the ground drive mechanism without also actuating the bail since the wing 114 of the lever contacts the bail.

A third embodiment of the ground drive control lever is shown in FIGS. 16–19, and is adapted solely for use with an apparatus having an upper bail that is positioned above the handle bar of the apparatus for movement between a non-actuated position in which the bail is suspended over the handle bar and an actuated position in which the bail is drawn down against the handle bar.

As shown in FIG. 16, the ground drive control lever 120 is formed of a single unitary piece of molded thermoplastic resin. The lever is generally L-shaped, including a transverse hole 122 extending through the lever at one end thereof, as shown in FIG. 18, and a handle 124 defined by the second end by which the lever may be gripped for movement. The elbow of the lever between the ends includes a transverse pin 126 by which the lever is connected to the coupling element 76.

As shown in FIG. 19, a retaining clip 128 retains the lever 120 in the actuated position upon movement of the lever to the actuated position but permits the lever to be returned to the non-actuated position shown in FIG. 18 when a force is exerted on the lever sufficient to overcome the gripping force of the retaining clip on the coupling element. The retaining clip 128 is formed of a unitary piece of spring metal and is preferably similar to the clip illustrated in FIG. 8, including opposed side faces provided with transverse holes, and presenting fingers 130 that are biased toward one another and capture the coupling element when the element is moved between the fingers. A means is provided for mounting the retaining clip 128 on the lever 120 with the holes in the spring clip aligned with the transverse hole 122 in the lever. Preferably, this means includes a socket formed as a part of the lever and within which the retaining clip is secured so that the clip and lever always move together relative to the bail.

During use, as the lever is moved to the actuated position, the coupling element 76 passes over the shoulders of the fingers 130, and is retained in place. In order to move the lever from the actuated position, it is necessary to push the handle 124 forward with a force sufficient to separate the fingers 130 from one another and allow passage of the coupling element 76. Because the retaining clip 128 rotates with the lever, it rotates away from the coupling element as the lever is moved to the non-actuated position, facilitating release of the coupling element.

As shown in FIG. 17, the lever includes a pair of laterally extending shoulders 132 that protrude from the sides of the lever along the length of the handle 124. One of the shoulders defines a release means and is disposed within the path of movement of the bail 22 when the lever 120 is in the actuated position. Thus, when the bail moves from the actuated to the non-actuated position it contacts the shoulder 132 of the lever and forces the lever against the retention force of the retaining clip 128, overcoming the retention force and releasing the lever 120 for movement to the non-actuated position under the biasing force of the spring of the ground drive control mechanism. The other shoulder engages the handle bar when the lever is pivoted to the actuated and non-actuated positions, limiting forward and rearward travel of the lever.

Various modifications to the cable control lever apparatus are illustrated in FIGS. 20–23, and can be incorporated into any of the preferred embodiments described herein and shown in the drawing figures. With reference to FIG. 20, a first modification includes providing a coupling element on which a bumper means is provided for stopping movement of the ground drive control lever and the coupling element when the lever is moved to the non-actuated position.

The coupling element 76' is similar to the coupling element 76 described previously in that it includes an elongated intermediate section 84' and a hook end adapted for connection to the control lever 24'. However, as shown in FIG. 21, instead of providing a coiled end for receiving the end connector of the cable 48', the element includes an end piece 134 secured to the end 136 of the intermediate section 84' opposite the hook end. The end 136 of the intermediate section is preferably flattened to receive the end piece 134, and the end piece is zinc die cast directly onto the element over the flattened region.

As shown in FIG. 24, the end piece 134 includes a transverse, cylindrical slot 138 intermediate the axial ends of the end piece, and an axial slot 140 extends between the transverse slot and the distal end of the piece opposite the coupling element 76'. The cable 48' is provided with an end connector 142 in the form of a cylindrical plug having a longitudinal axis that extends in a direction transverse to the length of the cable. The cylindrical plug 142 is sized for receipt in the transverse slot 138 of the end piece and the axial slot 140 receives the cable so that the cable is retained by the end piece for movement with the coupling element.

The bumper means includes a rubber or rubber-like boot 144 that is received over the end piece. Although either natural or synthetic rubbers may be used, synthetic rubber is preferred, an example of which is marketed under the trademark SANTOPRENE™. The boot is cylindrical, including an axial bore sized for receipt of the cable 48', and an axially extending cavity 146 in one end of the boot for receiving the end piece 134. The boot can thus be received over the end piece upon assembly to protect the end piece and to retain the end connector of the cable in place within the transverse slot of the end piece. The end of the boot opposite the cavity 146 is solid except for the axial bore, and presents a resilient material that is interposed between the end piece and a conduit fitting 148 that is secured to the handle bar 18.

During operation, when the control lever 24' is moved from the actuated position, shown in dotted lines in FIG. 20, to the non-actuated position, shown in solid lines in FIG. 20, the coupling element 76' moves toward the conduit fitting 148 and the boot 144 engages the fitting to limit movement of the control lever and to absorb the momentum of the lever.

Another modification that can be included on any of the previously described embodiments of the control lever is illustrated in FIGS. 22–23, and comprises a modified pin 74' for supporting the coupling element 76 so that the hook end 78 of the element can be formed with the tip of the hook end spaced from the intermediate section 84 by a distance less than the diameter of the pin. If the spacing between the tip of the hook end 78 and the intermediate section 84 is equal to or greater than the diameter of the pin, it is possible that the coupling element will be forced off of the pin when the lever is moved toward the non-actuated position relative to the coupling element.

As shown in FIG. 23, by providing a notch 150 in the pin 74', it is possible to assemble the coupling element on the lever by placing the tip of the hook end 78 in the notch 150 and rotating the lever in a counterclockwise direction, turning the pin 74' into the hook end of the element. Thereafter, as shown in FIG. 22, when the lever is supported on the handle bar of the lawnmower, the lever is oriented with the notch facing the gap between the tip of the hook end and the intermediate section of the coupling element. Thus, the full diameter of the pin is presented to the gap of the coupling element as the lever is rotated between the actuated and non-actuated positions, preventing the coupling element from pulling free of the lever. When the lever is rotated relative to the coupling element beyond the non-actuated position during assembly, the pin presents a reduced diameter at the notch which permits the coupling element to be assembled on the lever.

Although the present invention has been described with reference to the preferred embodiment illustrated in the attached drawing figures, it is noted that substitutions may be made and equivalents employed herein without departing from the scope of the invention as recited in the claims.

What is claimed is:

1. In a lawnmower apparatus having a mower deck, a handle bar connected to the deck for permitting walk-behind operation of the mower, and a pair of control cables supported for translational movement relative to the handle bar, the handle bar including a pair of laterally spaced side arms, and an end bar extending between the side arms and connecting them together, each side arm including a transverse hole aligned with the hole in the other arm, a cable control lever apparatus comprising:

a bail including opposed out-turned ends sized for receipt in the holes in the handle bar to permit relative pivotal movement of the bail between a non-actuated position spaced from the end bar of the handle bar and an actuated position against the end bar;

a first coupling means for coupling a first one of the cables to the bail so that movement of the bail is transmitted to the first cable;

a lever supported on one of the out-turned ends of the bail between the bail and the handle bar so that when the bail is in the actuated position, the lever can be pivoted about the one out-turned end of the bail between a non-actuated position and an actuated position, the lever including a retaining means for retaining the lever in the actuated position, and a release means for releasing the lever from the retaining means when the bail moves to the non-actuated position, allowing the lever to move to the non-actuated position; and a second coupling means for coupling a second one of the cables to the lever so that movement of the lever is transmitted to the second cable.

2. An apparatus as recited in claim 1, further comprising a first biasing means for biasing the lever toward the non-actuated position and a second biasing means for biasing the bail toward the non-actuated position.

3. An apparatus as recited in claim 2, wherein the second coupling means includes a coupling element extending between the second cable and the lever, the retaining means including a clip on the lever for gripping the coupling element when the lever is moved to the actuated position to hold the lever against the force of the first biasing means.

4. An apparatus as recited in claim 3, wherein the clip includes a pair of laterally opposed clip fingers that are biased toward one another so that when the coupling element is received between the fingers, the element is retained by the clip.

5. An apparatus as recited in claim 1, wherein the release means includes a stop supported on the lever and extending into the path of movement of the bail when the lever is in the actuated position so that when the bail moves to the non-actuated position, it contacts the stop and overcomes the retaining means.

6. An apparatus as recited in claim 5, wherein the stop includes a transverse surface on the lever that is engaged by the bail to force the lever from the actuated position when the bail is released from the actuated position.

7. In a lawnmower apparatus having a mower deck, a handle bar connected to the deck for permitting walk-behind operation of the mower, a cutting blade supported by the deck, a safety means for rendering the blade inoperative, a bail supported on the handle bar, a first cable supported for translational movement within an outer conduit and being connected between the safety means and the bail for transmitting movement of the bail to the safety means, a ground drive assembly for driving the mower along the ground, a lever supported on the handle bar, a second cable supported for translational movement within an outer conduit and being connected between the ground drive assembly and the lever for transmitting movement of the lever to the ground drive assembly, the improvement comprising:

- the handle bar including a pair of laterally spaced side arms, and an end bar extending between the side arms and connecting them together, each side arm including a transverse hole aligned with the hole in the other arm and adapted to support the bail;
- the bail including opposed out-turned ends sized for receipt in the holes in the handle bar to permit relative pivotal movement of the bail between a non-actuated position spaced from the end bar of the handle bar and an actuated position against the end bar;
- the lever being supported on one of the out-turned ends of the bail for pivotal movement so that when the bail is in the actuated position, the lever can be pivoted between a non-actuated position and an actuated position, the lever being retained on the out-turned end of the bail by the handle bar and including a retaining means for retaining the lever in the actuated position upon movement of the lever to the actuated position;
- biasing means for biasing the lever and the bail toward the non-actuated positions; and
- release means for releasing the lever from the retaining means when the bail moves to the non-actuated position, allowing the lever to move to the non-actuated position.

* * * * *